United States Patent
Honda

[11] Patent Number: 6,053,307
[45] Date of Patent: Apr. 25, 2000

[54] APPARATUS FOR CHANGING AND GUIDING RUNNING DIRECTION OF CONVEYOR BELT

[75] Inventor: Katsuya Honda, Yokohama, Japan

[73] Assignee: Honda Sangyo Kabushiki Kaisha, Kanagawa-Ken, Japan

[21] Appl. No.: 09/139,741

[22] Filed: Aug. 25, 1998

[30] Foreign Application Priority Data

Sep. 19, 1997 [JP] Japan ..................................... 9-273947
Sep. 26, 1997 [JP] Japan ..................................... 9-279705

[51] Int. Cl.$^7$ .................................................. B65G 15/62
[52] U.S. Cl. ........................... 198/839; 198/840; 198/842
[58] Field of Search .................................... 198/837, 839, 198/840, 841, 842, 861.2, 861.3

[56] References Cited

U.S. PATENT DOCUMENTS

| | | | |
|---|---|---|---|
| 3,422,949 | 1/1969 | Kraft et al. ........................... | 198/837 X |
| 3,550,535 | 12/1970 | Rooklyn ............................... | 198/837 X |
| 3,590,984 | 7/1971 | Nolte .................................... | 198/837 X |
| 3,927,814 | 12/1975 | Holm .................................... | 198/837 |
| 4,008,801 | 2/1977 | Reilly et al. ......................... | 198/837 X |
| 4,804,081 | 2/1989 | Lenhardt .............................. | 198/842 X |
| 4,899,872 | 2/1990 | Hokeo ................................... | 198/840 |

*Primary Examiner*—James R. Bidwell
*Attorney, Agent, or Firm*—Bacon & Thomas

[57] ABSTRACT

A main object of the present invention is to provide a running direction changing and guiding apparatus for a conveyor belt which can change a running direction of a conveyor belt having a concave portion formed on a transferring surface of the conveyor belt by only one conveyor belt. An apparatus comprising a belt main body wound between a main drive pulley and a driven pulley and structured so that a zigzag motion is prevented by engaging a guide body linearly arranged in a back surface of left and right side portions of the belt main body along a running direction of the belt main body with a guide groove on a peripheral surface of the main drive pulley and a peripheral surface of the driven pulley, characterized in that the apparatus comprises guide body supporting rollers opposing to each other so as to form a pair and supporting inner and outer side surfaces of the guide body arranged on the back surface of the left and right side portions of the belt main body by peripheral surfaces thereof, a belt pressing roller for pressing the left and right side portions of the belt main body from the transferring surface side toward the guide body supporting rollers by a peripheral surface thereof for positioning the guide body between the guide body supporting rollers, and a running direction changing roller arranged in parallel to the belt pressing roller, and changing the running direction of the belt main body by moving the transferring surface of the belt main body along the peripheral surface. The running direction of the belt main body is changed from descent to ascent directions, from horizontal to ascent directions or from descent to horizontal directions.

9 Claims, 10 Drawing Sheets

APPARATUS FOR CHANGING AND GUIDING RUNNING DIRECTION OF CONVEYOR BELT

BACKGROUND OF THE INVENTION

1. Field of the Invention

The present invention relates to an apparatus for changing and guiding a running direction of a conveyor belt, and more particularly to an apparatus for changing and guiding a running direction of a conveyor belt, which can change the running direction from a horizontal direction to an ascent direction, from a descent direction to a horizontal direction or from a descent direction to an ascent direction of a conveyor belt.

2. Description of the Prior Art

As is well known, in a factory, a warehouse and the like, a conveyor belt is used for transferring an object between various kinds of apparatuses and between work stations, the conveyor belt mentioned above is constituted by a belt main body wound between a main drive pulley and a driven pulley, and it is structured such that a zigzag motion when the belt main body runs is prevented by engaging a guide body linearly arranged in a back surface of the belt main body mentioned above along a running direction of the belt main body with a guide groove formed on a peripheral surface of the main drive pulley and the driven pulley.

By the way, in the factory, the warehouse and the like, there is a case that it is necessary to change the running direction of the conveyor belt due to a difference in level between the apparatuses or between the working stations, a limitation of an arranging position for the conveyor belt, and the like. The change of the running direction mentioned above basically comprises a change from a horizontal direction to a descent direction, a change from an ascent direction to a horizontal direction, a change from an ascent direction to a descent direction, a change from a horizontal direction to an ascent direction, a change from a descent direction to a horizontal direction and a change from a descent direction to an ascent direction, and they can be mainly separated into two cases.

Accordingly, they can be separated into the case that a changing portion of the running direction forms a convex portion on a transferring surface of the conveyor belt such as the change from the horizontal direction to the descent direction, the change from the ascent direction to the horizontal direction and the change from the ascent direction to the descent direction, and the case that the changing portion of the running direction forms a concave portion on the transferring surface of the conveyor belt such as the change from the horizontal direction to the ascent direction, the change from the descent direction to the horizontal direction and the change from the descent direction to the ascent direction.

Then, in the case that the changing portion of the running direction mentioned above forms the convex portion on the transferring surface of the conveyor belt, only one conveyor belt can easily realize the change of the running direction by arranging a direction changing pulley for changing the running direction at a back surface (a back surface of the transferring surface) side of the belt main body constituting the conveyor belt.

However, in the case that the changing portion of the running direction mentioned above forms the concave portion on the transferring surface of the conveyor belt, that is, in order to change the running direction of the conveyor belt from the horizontal direction to the ascent direction, from the descent direction to the horizontal direction and from the descent direction to the ascent direction, it is necessary to provide a guide pulley for changing the direction in the transferring surface side of the belt main body constituting the conveyor belt mentioned above. In this case, since the direction changing pulley interrupts the transferring surface of the belt main body and prevents the object from being transferred, only one conveyor belt can not finally change the running direction, so that the direction change in the case that the concave portion is formed on the transferring surface of the conveyor belt is actually performed by combing a flat conveyor and an inclined conveyor.

Further, in the case that the direction changing pulley is not used, since there occurs a problem that a looseness is generated in the belt main body 1 and a running of the belt main body 1 becomes unstable, only one conveyor belt can not finally achieve the change of the running direction, so that the change of the running direction of the conveyor belt from the horizontal direction to the ascent direction, from the descent direction to the horizontal direction and from the descent direction to the ascent direction (a V shape) is actually performed by combining the flat conveyor and the inclined conveyor having a different running direction or the inclined conveyors and the inclined conveyor.

In accordance with the conventional art mentioned above, the change of the running direction of the conveyor belt in the case that the changing portion of the running direction forms the concave portion on the transferring surface of the conveyor belt is performed by combining the conveyor belts having a different running direction, however, in the case of changing the running direction of the conveyor belt by combining the conveyor belts having a different running direction, a plurality of conveyor belts are required and drive means is required for each of the conveyor belts, so that there is generated a disadvantage that a cost for arranging and operating them is increased.

Further, in order to smoothly moving the object between the conveyor belts having a different running direction, it is necessary to minutely set a diameter of a pulley in the conveyor belt and a running speed, and to always monitor a synchronism of a plurality of running conveyor belts, so that various difficulties are accompanied for setting and operating them.

SUMMARY OF THE INVENTION

Accordingly, an object of the present invention is to solve the problems of in the conventional art mentioned above, and to provide an apparatus for changing and guiding a running direction of a conveyor belt, in which only one conveyor belt can change a running direction of a conveyor belt in the case that a changing portion of the running direction forms a concave portion on a transferring surface of the conveyor belt (a change from a horizontal direction to an ascent direction, a change from a descent direction to a horizontal direction and a change from a descent direction to an ascent direction).

In order to achieve the object mentioned above, the present invention has the following technical means. Accordingly, an explanation will be given with reference numerals in the accompanying drawings corresponding to an embodiment. There is provided an apparatus for changing and guiding a running direction of a conveyor belt, which is applied to a conveyor belt comprising a belt main body 1 wound between a main drive pulley 6 and a driven pulley 8 and structured such that a zigzag motion when the belt main body 1 runs is prevented by engaging a guide body 3 linearly arranged in a back surface 2 of left and right side portions 25 and 26 of the belt main body 1 along a running direction F of the belt main body 1 with a guide groove 10 formed on a peripheral surface 7 of the main drive pulley 6 and a peripheral surface 9 of the driven pulley 8, and changes and guides the running direction of the conveyor belt in the case that a changing portion H of the running direction F forms a concave portion on a transferring surface G of the conveyor belt, wherein a running direction changing and guiding apparatus 11 for the conveyor belt comprises guide body supporting rollers 13 and 14 opposing to each other so as to form a pair and supporting an inner side surface 4 and an outer side surface 5 of the guide body 3 arranged on the back surface 2 of the left and right side portions 25 and 26 of the belt main body 1 by peripheral surfaces 15 and 16 thereof, a belt pressing roller 17 for pressing the left and right side portions 25 and 26 of the belt main body 1 from the transferring surface G side toward the guide body supporting rollers 13 and 14 opposing to each other so as to form a pair by a peripheral surface 18 thereof for positioning the guide body 3 between the guide body supporting rollers 13 and 14 opposing to each other so as to form a pair, and a running direction changing roller 19 arranged in parallel to the belt pressing roller 17, pressing the left and right side portions 25 and 26 of the belt main body 1 from the transferring surface G side by a peripheral surface 20 thereof and changing the running direction F of the belt main body 1 by moving the transferring surface G of the belt main body 1 along the peripheral surface 20.

It is characterized that each of a pair of guide body supporting rollers 13 and 14, the belt pressing roller 17 and the running direction changing roller 19 constituting the running direction changing and guiding apparatus 11 for the conveyor belt has a mounting member 21 capable of attaching to an optional position of a frame of the conveyor belt to which the main drive pulley 6 and the driven pulley 8 are supported, and mounted to an L-shaped main body frame 12 having a surface 28 perpendicular to a surface 27 parallel to the transferring surface G of the conveyor belt, the guide rollers 13 and 14 opposing to each other so as to form a pair are mounted to the surface 27 parallel to the transferring surface G of the main body frame 12, and the belt pressing roller 17 and the running direction changing roller 19 are mounted to the surface 28 perpendicular to the transferring surface G of the main body frame 12, whereby the running direction changing and guiding apparatus 11 for the conveyor belt is constituted as an integral unit.

It is possible that the running direction changing roller 19 is arranged at an upstream side and a downstream side of the belt pressing roller 17 and the guide body supporting rollers 13 and 14, and the running direction F of the conveyor belt is changed in any one or both of the upstream side and the downstream side of the belt pressing roller 17 and the guide body supporting rollers 13 and 14.

It is possible that the running direction changing roller 19 is arranged at an upstream side of the belt pressing roller 17 and the guide body supporting rollers 13 and 14, and the running direction F of the conveyor belt is changed in the upstream side of the belt pressing roller 17 and the guide body supporting rollers 13 and 14.

It is possible that the running direction changing roller 19 is arranged at a downstream side of the belt pressing roller 17 and the guide body supporting rollers 13 and 14, and the running direction F of the conveyor belt is changed in the downstream side of the belt pressing roller 17 and the guide body supporting rollers 13 and 14.

Further, it is characterized that in the conveyor belt in which the running direction F of the belt main body 1 is changed at a changing portion H of the running direction F positioned between the main drive pulley 6 and the driven pulley 8 from a descent direction to an ascent direction (a V-shaped manner), from a horizontal direction to an ascent direction or a descent direction to a horizontal direction, the guide body supporting rollers 13 and 14 opposing to each other so as to form a pair are disposed in each of the upstream side and the downstream side of the running direction F of the conveyor belt with holding the belt pressing roller 17 therebetween, that is, totally two pairs are disposed, and an interval S between the guide body supporting rollers 13 and 14 opposing to each other so as to form a pair and positioned in the upstream side is set to be greater than an interval T between the guide body supporting rollers 13 and 14 opposing to each other and positioned in the downstream side.

It is preferable to form a horizontal cross section of the guide body 3 in a tapered trapezoidal shape and attach a taper on an outer peripheral surface of the guide body supporting rollers 13 and 14.

Since the present invention is constituted by the technical means mentioned above, and is structured such as to guide and hold the left and right side portions 25 and 26 of the belt main body 1 in which the guide body 3 is arranged by the guide body supporting rollers 13 and 14 opposing to each other so as to form a pair and the belt pressing roller 17 constituting the running direction changing and guiding apparatus 11 for the conveyor belt, and change the running direction F of the belt main body 1 by the running direction changing roller 19 in this state, no looseness is generated in the belt main body 1 wound between the main drive pulley 6 and the driven pulley 8, so that the running of the belt main body 1 can be securely performed. Further, since the belt pressing roller 17 and the running direction changing roller 19 constituting the running direction changing and guiding apparatus 11 for the conveyor belt hold only the left and right side portions 25 and 26 of the transferring surface G of the belt main body 1, the belt pressing and the running direction changing rollers do not interrupt the transferring surface G of the belt main body 1 and do not prevent the object from being transferred, there can be obtained a running direction changing and guiding apparatus for the conveyor belt, which can change the running direction F of the conveyor belt by only one conveyor belt in the case that the changing portion H of the running direction F forms the concave portion on the transferring surface G of the conveyor belt (from a horizontal direction to an ascent direction, from a descent direction to a horizontal direction and from a descent direction to an ascent direction).

Further, since the guide body supporting rollers 13 and 14 opposing to each other so as to form a pair and constituting the running direction changing and guiding apparatus 11 are arranged in the upstream side and the downstream side of the running direction F of the conveyor belt with holding the belt pressing roller 17 therebetween, that is, totally two pairs are arranged, and the interval S between the guide body supporting rollers 13 and 14 positioned in the upstream side and opposing to each other so as to form a pair is set to be larger than the interval T between the guide body supporting rollers 13 and 14 positioned in the downstream side and opposing to each other so as to form a pair, the guide body 3 arranged on the back surface 2 of the belt main body 1 is smoothly guided between the guide body supporting rollers 13 and 14 opposing to each other so as to form a pair, so that a guiding performance of the guide body supporting rollers 13 and 14 opposing to each other so as to form a pair is improved and the running direction F of the belt main body 1 can be more securely changed by the running direction changing and guiding apparatus 11.

DESCRIPTION OF THE PREFERRED EMBODIMENTS

An embodiment in accordance with the present invention will be described in detail with reference to the attached drawings.

Figure 1:
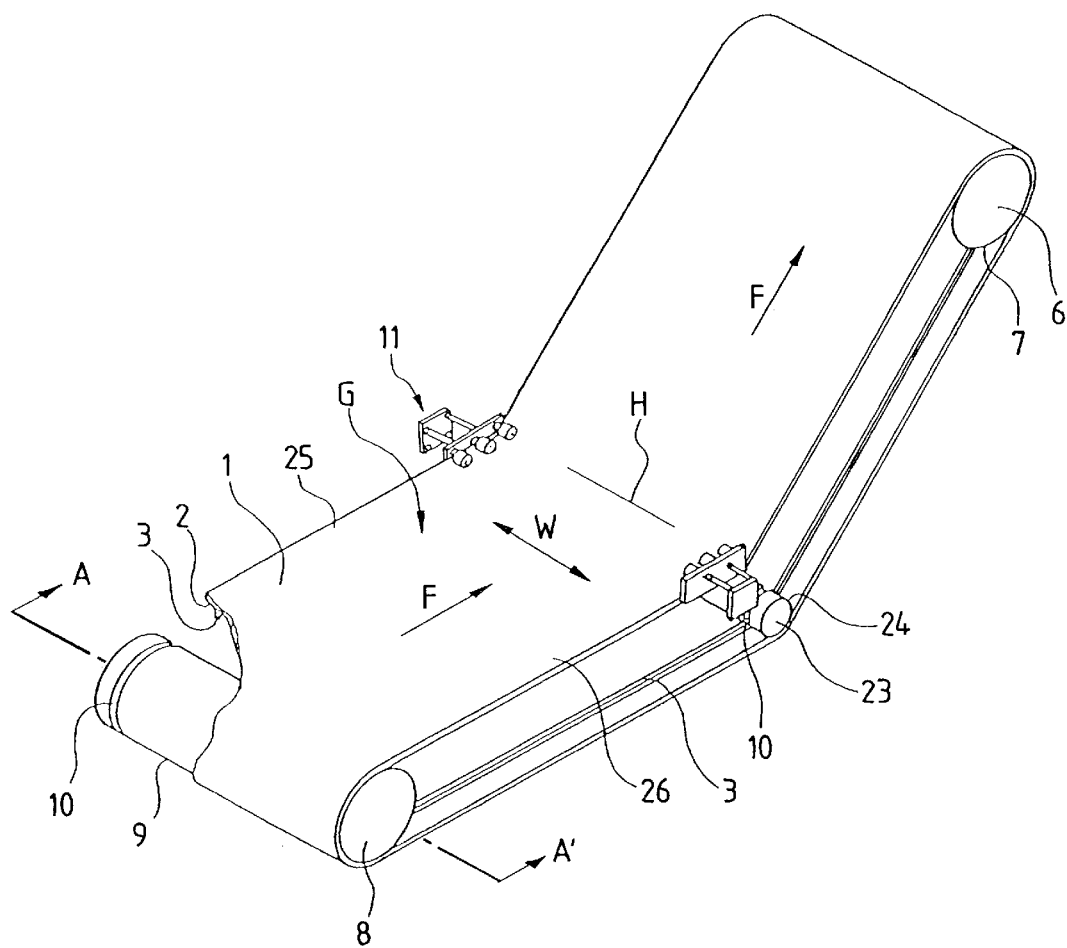
FIG. 1 is a wholly perspective view of a conveyor belt in which a running direction changing and guiding apparatus for a conveyor belt is arranged.
Figure 2:
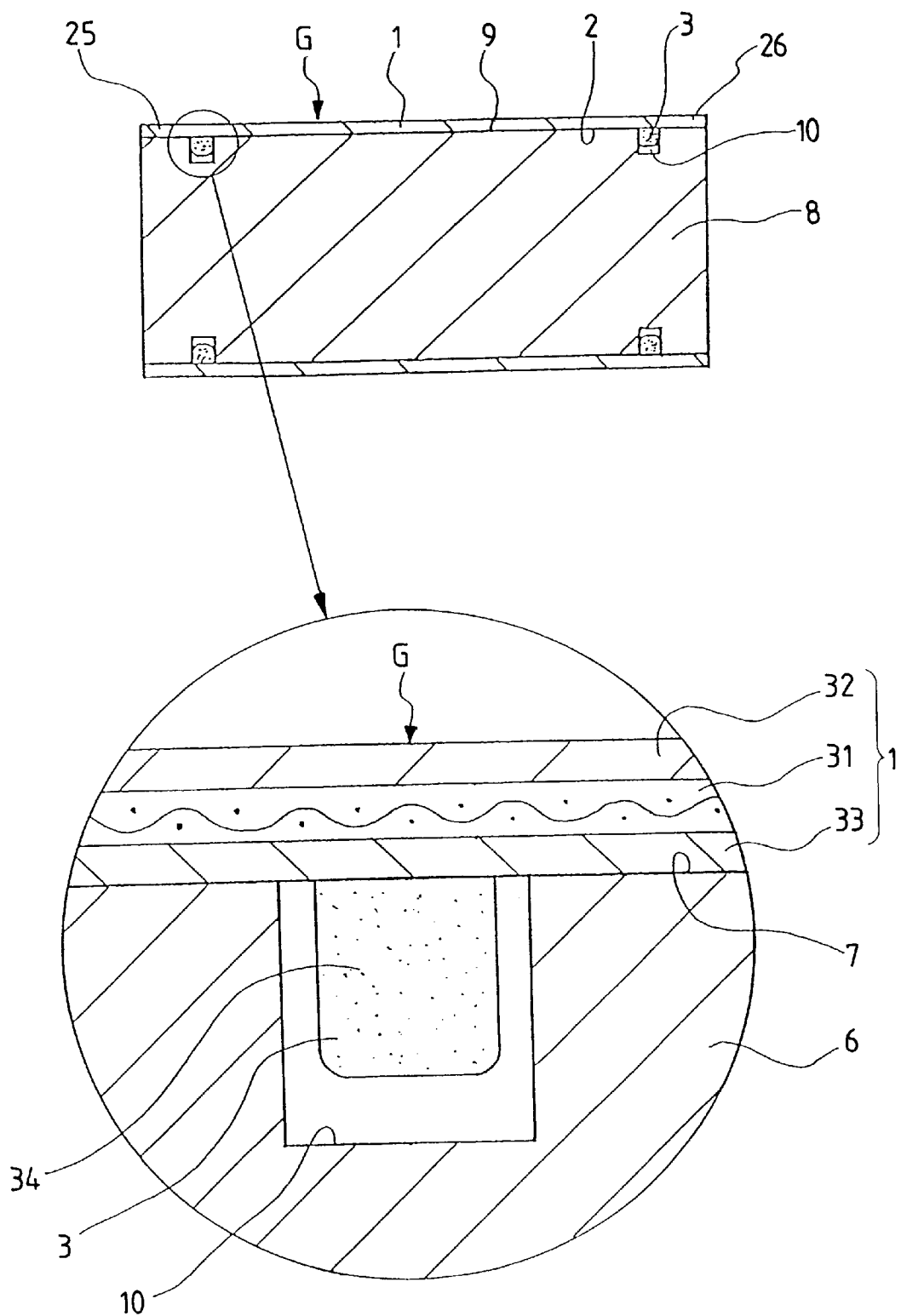
FIG. 2 is a cross sectional view along a line A–A' in FIG. 1 and a partially enlarged view.

A conveyor belt to which a running direction changing and guiding apparatus for a conveyor belt in accordance with the present invention will be first described below. The conveyor belt is constituted by a belt main body 1 wound between a main drive pulley 6 and a driven pulley 8 supported at both ends of a frame (not shown), as shown in FIGS. 1 and 2, a guide body 3 linearly formed along a running direction F of the belt main body 1 is disposed on a back surface 2 of left and right side portions 25 and 26 of the belt main body 1, a guide groove 10 for guiding the guide body 3 disposed on the back surface 2 of the belt main body 1 is formed on a peripheral surface 7 of the main drive pulley 6 and a peripheral surface 9 of the driven pulley 8, and it is structured such that a zigzag motion when the belt main body 1 runs is prevented by engaging the guide body 3 with the guide groove 10.

Further, it is structured such that a running direction F of the belt main body 1 is changed at a changing portion H of the running direction F positioned between the main drive pulley 6 and the driven pulley 8 from a descent direction to an ascent direction (a V-shaped manner), from a horizontal direction to an ascent direction or from a descent direction to a horizontal direction.

Still further, it is structured such that a changing from the descent direction to the ascent direction (a V-shaped manner) in the running direction F of the belt main body 1 in the belt conveyor, from the horizontal direction to the ascent direction or from the descent direction to the horizontal direction is performed by the running direction changing and guiding apparatus 11 mounted to the changing portion H of the running direction in the belt main body 1.

Figure 3:
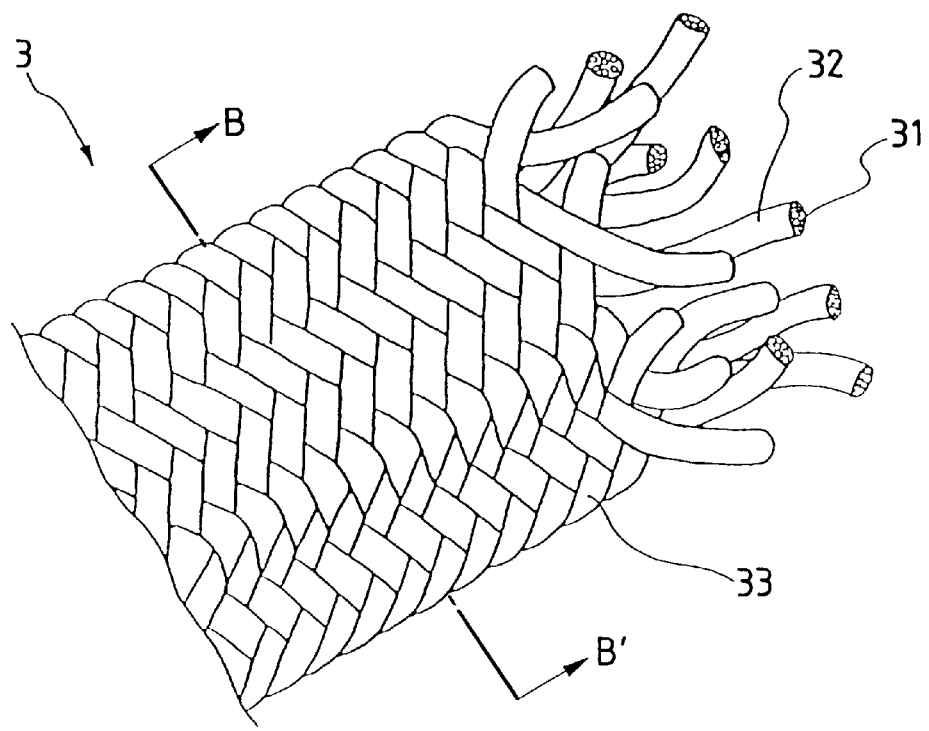
FIG. 3 is a perspective view which shows a structure of a guide body.
Figure 4:
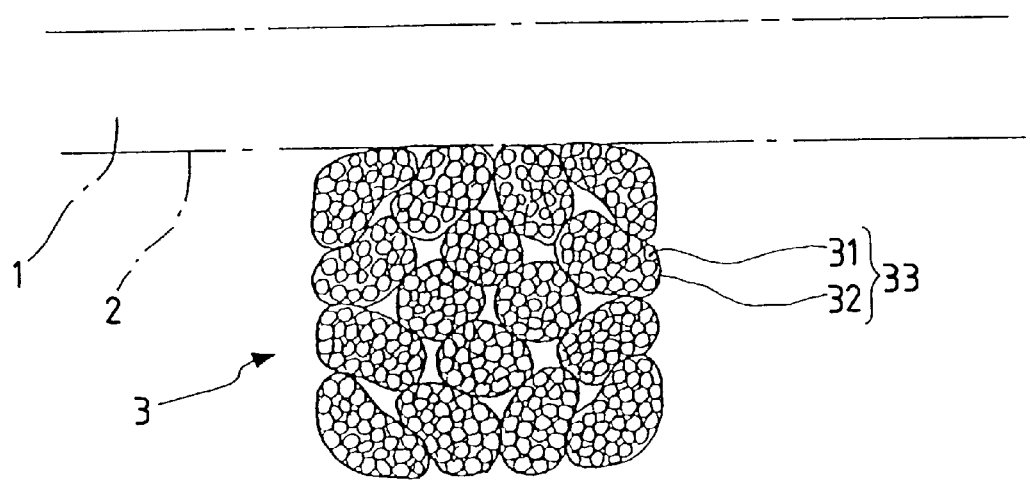
FIG. 4 is a cross sectional view along a line B–B' in FIG. 3.

Furthermore, the belt main body 1 is formed by impregnating a base material sheet having a good heat resistance such as an aramid resin containing a glass, a polyester and the like with a fluorine resin such as a polytetrafluoroethylene (PTFE), a polychloro-trifluoroethylene (PCTFE) and the like and firing, the guide body 3 arranged on the back surface 2 of the belt main body 1 is constituted by a band-like body 33 (FIGS. 3 and 4) formed by bundling a plurality of fibers 32 made of a fiber material 31 having a good heat resistance such as an aramid resin containing a glass, a polyester and the like and is formed by impregnating with a fluorine resin such as a polytetrafluoroethylene (PTFE), a polychloro-trifluoroethylene (PCTFE) and the like and firing in the same manner as the base material sheet constituting the belt main body 1.

In more detail, the belt main body 1 may be constituted by a two-layered band-like body formed by combining a surface member made of a resin material such as polyvinyl chloride, thermoplastic polyurethane, crosslinking type polyurethane, silicone, acrylonitrile-butadiene rubber, ethylene-propylene-terpolymer and the like or a transferring surface forming member 32 made of a fiber material such as polyamide, polyester, cotton and the like onto the surface to a core body 31 made of a fiber material such as polyester, polyamide, cotton, cellulose, glass and the like, hamid resin and the like by a bonding material, or a three-layered band-like body formed by combining a running surface forming member 33 formed in the same manner as that of the transferring surface forming member 32 onto the back surface of the core body 31 of the two-layered band-like body, as shown in FIG. 2 (in this embodiment, the three-layered construction will be shown). Further, illustration is omitted, however, there is a case that a ledge or the like for improving the transferring performance by the belt main body 1 is disposed on the surface (the transferring surface G) of the belt main body 1.

In this case, the guide body 3 arranged on the back surface 2 of the left and right side portions 25 and 26 in the belt main body 1 is integrally mounted to the back surface 2 of the belt main body 1 by sewing, bonding or the like. Or, the guide body 3 may be constituted by a guide body forming member 34 formed by molding a resin material such as a polyurethane and the like by an extrusion molding, and constructed by bonding or welding the guide body forming member 34 onto the back surface 2 of the left and right side portions 25 and 26 in the belt main body 1. In addition, the guide body 3 can be formed by integrally molding the running surface forming member 33 and the guide body forming member 34 constituting the belt main body 1.

Then, FIG. 1 shows a state of applying the running direction changing and guiding apparatus 11 for the conveyor belt in accordance with the present invention to the belt conveyor mentioned above. The running direction changing and guiding apparatus 11 for the conveyor or belt is attached to a symmetrical position in a lateral direction at an optional position in the frame of the conveyor belt and changes the running direction F of the conveyor belt by guiding and holding the left and right side portions 25 and 26 of the conveyor belt at an optional position. In this embodiment, a case of changing the running direction F of the conveyor belt from the horizontal direction to the ascent direction is shown and a case that the changing portion H of the running direction F forms a concave portion on the transferring surface G of the conveyor belt is shown.

Further, an auxiliary pulley 23 for avoiding the back surfaces 2 of the belt main body 1 from being mutually brought into contact with each other is arranged below the changing portion H of the running direction F of the conveyor belt forming the concave portion on the transferring surface G of the conveyor belt, and the auxiliary pulley 23 is also structured such that the guide groove 10 is formed on a peripheral surface 24 thereof in the same manner as the main drive pulley 6 and the driven pulley 8, there preventing the belt main body 1 from moving in a zigzag manner.

Next, a detail of the running direction changing and guiding apparatus 11 for the conveyor belt in accordance with the present invention will now be described (in this embodiment, the following description will be given to a structure positioned in the left side portion 25 in a widthwise direction of the conveyor belt, however, a structure positioned in the right side portion 26 is the same, so that a description thereof will be omitted).

Figure 5:
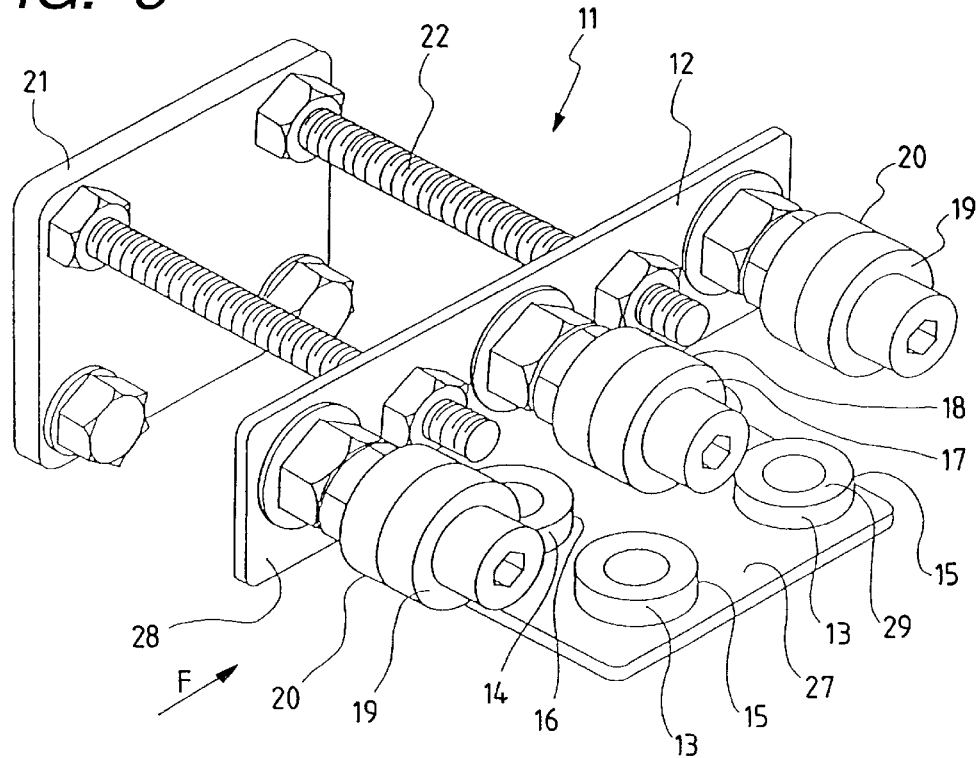
FIG. 5 is a perspective view which shows a structure of a running direction changing and guiding apparatus for a conveyor belt.

As shown in FIG. 5, the running direction changing and guiding apparatus 11 for the conveyor belt comprises the guide body supporting rollers 13 and 14 for guiding the guide body 3 arranged on the back surface 2 of the belt main body 1, opposing to each other so as to form a pair, the belt pressing roller 17 positioned above the guide body supporting rollers 13 and 14 opposing to each other so as to form a pair and pressing the left and right side portions 25 and 26 of the belt main body 1 from the transferring surface G side, and the running direction changing roller 19 arranged in parallel to the belt pressing roller 17, pressing the left and right side portions 25 and 26 of the belt main body 1 from the transferring surface G side and changing the running direction F of the belt main body 1.

Figure 7:
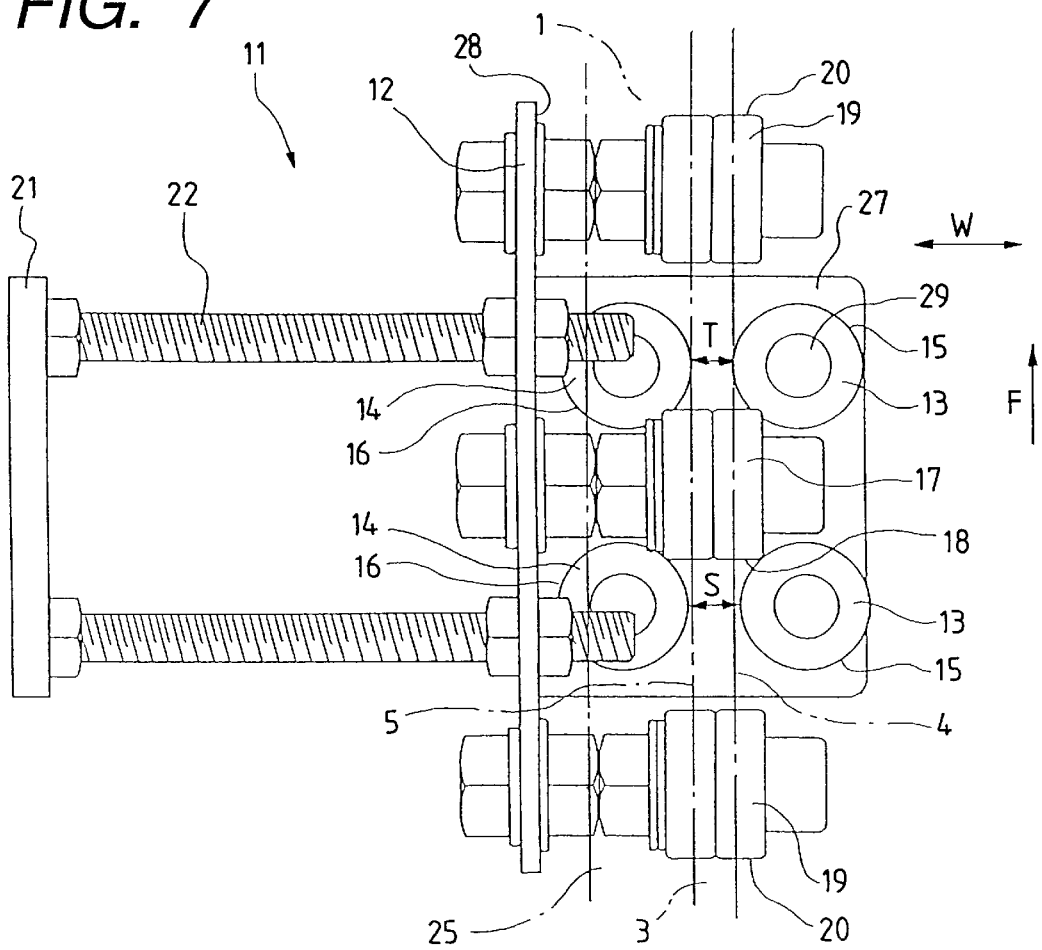
FIG. 7 is a plan view of a running direction changing and guiding apparatus for a conveyor belt.

Then, the guide body supporting rollers 13 and 14 opposing to each other so as to form a pair are arranged in such a manner as to support the inner side surface 4 and the outer side surface 5 of the guide body 3 arranged on the back surface 2 of the left and right side portions 25 and 26 of the belt main body 1 by the peripheral surfaces 15 and 16, and in this embodiment, two pairs of guide body supporting rollers 13 and 14 opposing to each other so as to form a pair are arranged as shown in FIG. 7, thereby restricting the belt main body 1 from displaying in a widthwise direction W of the belt main body 1 and preventing the belt main body 1 from moving in a zigzag manner.

Further, in accordance with this embodiment, a guiding performance of the guide body 3 is improved by making the interval S of the guide body supporting rollers positioned in the upstream side of the running direction F of the conveyor belt larger than the interval T of the guide body supporting rollers positioned in the downstream side thereof among the intervals S and T of two pairs of guide body supporting rollers 13 and 14 opposing to each other so as to form a pair.

Figure 8:
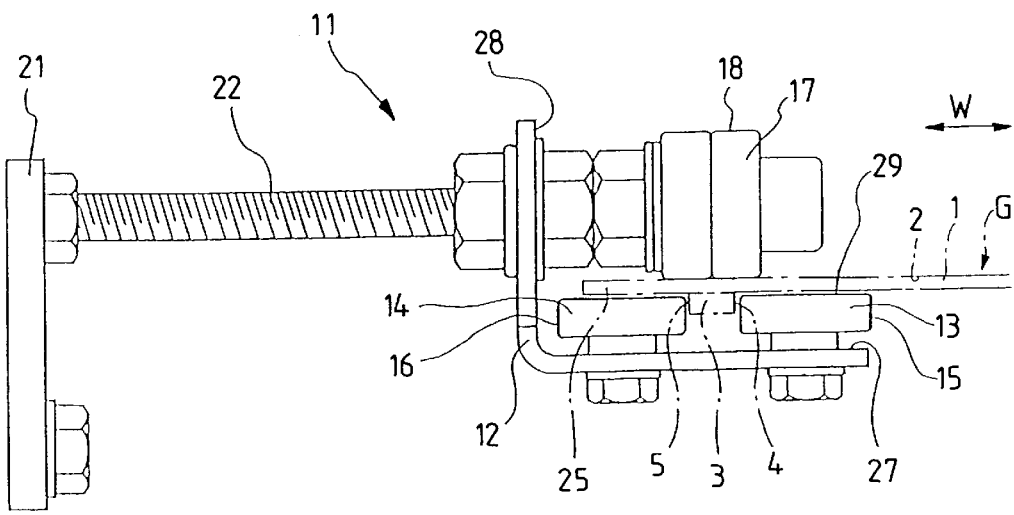
FIG. 8 is a leftward side elevational view of a running direction changing and guiding apparatus for a conveyor belt.

Then, the belt pressing roller 17 is arranged in such a manner as to press the left and right side portions 25 and 26 of the belt main body 1 from the transferring surface G side by the peripheral surface 18 thereof for positioning the guide body 3 formed on the back surface 2 of the belt main body 1 between the guide body supporting rollers 13 and 14 opposing to each other so as to form a pair, and in order to prevent the guide body 3 from coming out from the portion between the guide body supporting rollers 13 and 14 opposing to each other so as to form a pair, an interval between an upper surface 29 of the guide body supporting rollers 13 and 14 opposing to each other so as to form a pair and a portion P at which the peripheral surface 18 of the belt pressing roller 17 is brought into contact with the transferring surface G of the belt main body 1 is set to be about a thickness of the belt main body 1 (FIG. 8).

Figure 6:
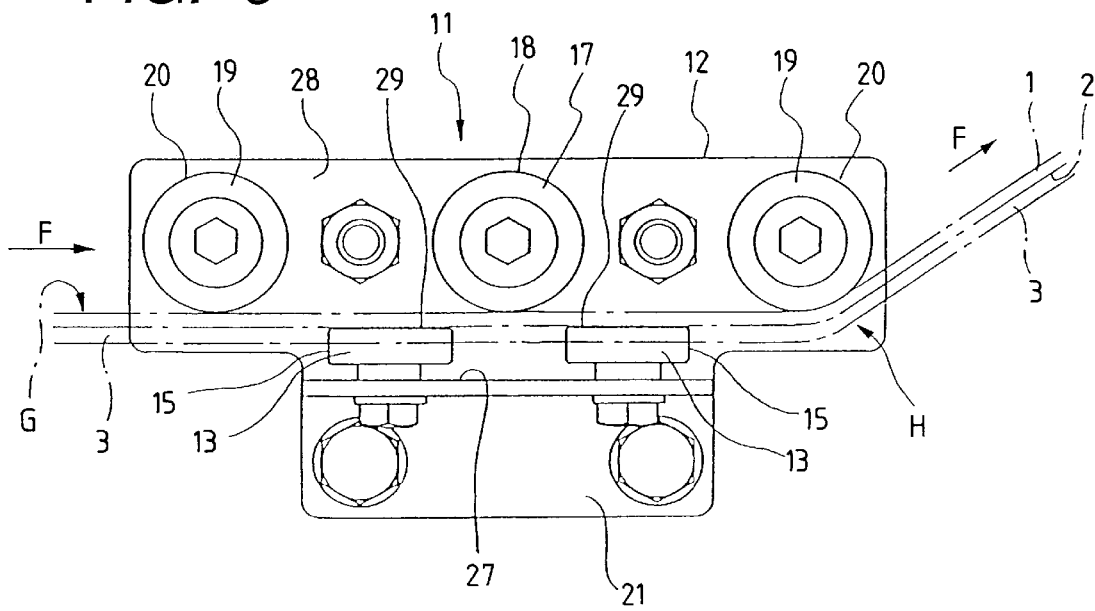
FIG. 6 is a front elevational view of a running direction changing and guiding apparatus for a conveyor belt.

Then, the running direction changing roller 19 is structured such as to change the running direction F of the belt main body 1 by pressing the left and right side portions 25 and 26 of the belt main body 1 from the transferring surface G side by the peripheral surface 20 thereof and moving the transferring surface G of the belt main body 1 along the peripheral surface 20. In this embodiment, the running direction changing roller 19 is arranged in the upstream side and the downstream side with holding the belt pressing roller 17 therebetween, structured in such a manner as to use the running direction changing and guiding apparatus 11 for the conveyor belt without relation to the right and left, and is shown in the case that the changing of the running direction F of the belt main body 1 is performed by the running direction changing roller 19 positioned in the downstream side of the belt pressing roller 17 (FIG. 6).

Further, the position at which the running direction changing roller 19 is arranged is preferably where the belt main body 1 is smoothly guided between the guide body supporting rollers 13 and 14 opposing to each other so as to form a pair and the belt pressing roller 17, that is, it is preferable that the transferring surface G of the belt main body 1 guided to the peripheral surface 18 of the belt pressing roller 17 through the peripheral surface 20 of the running direction changing roller 19 is as flat as possible.

Then, each of the guide body supporting rollers 13 and 14 opposing to each other so as to form a pair, the belt pressing roller 17 and the running direction changing roller 19 constituting the running direction changing and guiding apparatus 11 for the conveyor belt is mounted to the L-shaped main body frame 12 having the surface 27 parallel to the transferring surface G of the conveyor belt and the surface 28 perpendicular to the transferring surface G, the guide body supporting rollers 13 and 14 opposing to each other so as to form a pair are mounted to the surface 27 parallel to the transferring surface G of the main body frame 12 and the belt pressing roller 17 and the running direction changing roller 19 are mounted to the surface 28 perpendicular to the transferring surface G of the main body frame 12, thereby being constituted as an integral unit.

Further, the main body frame 12 to which the guide body supporting rollers 13 and 14 opposing to each other so as to form a pair, the belt pressing roller 17 and the running direction changing roller 19 are mounted as an integral unit is attached to the frame (not shown) of the conveyor belt through the mounting member 21, and the connecting member 22 positioned between the main body frame 12 and the mounting member 21 is constituted by a rod screw in this embodiment, constituted in such a manner as to easily adjust a length thereof and constituted so as to accurately set an attaching position of the running direction changing and guiding apparatus 11 of the conveyor belt with respect to the conveyor belt. It is also possible to directly attach the main body frame 12 to the frame of the conveyor belt.

Then, as the guide body supporting rollers 13 and 14 opposing to each other so as to form a pair, the belt pressing roller 17 and the running direction changing roller 19, a ball bearing is considered, so that the running direction changing and guiding apparatus 11 for the conveyor belt can be formed at a very low cost by using the known ball bearing of a standard article.

Next, on the basis of the structure mentioned above, an operation of the running direction changing and guiding apparatus for the conveyor belt in accordance with the present invention will be described below.

At first, the running of the conveyor belt comprising the belt main body 1 wound between the main drive pulley 6 and the driven pulley 8 is performed by rotating the main drive pulley 6 by means of a drive means (not shown), and at this time, the guide body 3 arranged on the back surface 2 of the left and right side portions 25 and 26 of the belt main body 1 is engaged with the guide groove 10 formed on the peripheral surface 7 of the main drive pulley 6 and the peripheral surface 9 of the driven pulley 8, whereby the belt main body 1 is restricted from displacing in the widthwise direction W and the conveyor belt is prevented from moving in a zigzag manner.

Then, the conveyor belt is structured such that the running direction F thereof is changed by the running direction changing and guiding apparatus 11 for the conveyor belt attached to an optional position between the main drive pulley 6 and the driven pulley 8 (in this embodiment, the change from the horizontal direction to the ascent direction is shown), and the position of mounting the running direction changing and guiding apparatus 11 for the conveyor belt becomes the changing portion H of the running direction F.

The running direction changing and guiding apparatus 11 for the conveyor belt supports the inner and outer side surfaces 4 and 5 of the guide body 3 arranged on the back surface 2 of the left and right side portions 25 and 26 of the belt main body 1 by the peripheral surfaces 15 and 16 of the guide body supporting rollers 13 and 14 opposing to each other so as to form a pair, and presses the left and right side portions 25 and 26 of the belt main body 1 toward the guide body supporting rollers 13 and 14 opposing to each other so as to form a pair from the transferring surface G side by the peripheral surface 18 of the belt pressing roller 17, thereby securely holding the belt main body 1 to the changing portion H of the running direction F by guiding and holding the belt main body 1 in such a manner as to be movable only in the running direction F thereof.

Further, the belt main body 1 is so structured for changes of direction to be caused by the direction changing roller 19 provided in the downstream side of the belt pressing roller 17, and the direction changing roller 19 is structured so as to change the running direction F thereof by moving the transferring surface G of the belt main body 1 along the peripheral surface 20 in a state of pressing the left and right side portions 25 and 26 of the belt main body 1 from the transferring surface G side by the peripheral surface 20 thereof and at the same time to more securely hold the belt main body 1 in the changing portion H of the running direction F.

Then, as mentioned above, the changing of the running direction F of the belt main body 1 is performed in a state that the belt main body 1 is securely held to the changing portion H of the running direction F, whereby no looseness is generated in the conveyor belt wound between the main drive pulley 6 and the driven pulley 8, and further, since the belt pressing roller 17 and the running direction changing roller 19 constituting the running direction changing and guiding apparatus 11 for the conveyor belt and positioned at the transferring surface G side of the belt main body 1 hold only the left and right side portions 25 and 26 of the belt main body 1, these roller do not interrupt the transferring surface G of the belt main body 1 and neither prevent the object from being transferred.

Accordingly, the running direction changing and guiding apparatus 11 for the conveyor belt in accordance with the present invention can change the running direction of the conveyor belt only by one conveyor belt in the case that the changing portion H of the running direction F forms the concave portion on the transferring surface G of the conveyor belt (from the horizontal direction to the ascent direction, from the descent direction to the horizontal direction and from the descent direction to the ascent direction), so that a cost for disposing and operating the conveyor belt can be decreased.

In this case, in this embodiment, the case of changing the running direction of the conveyor belt from the horizontal direction to the ascent direction is shown, however, the cases of changing the running direction from the descent direction to the horizontal direction and from the descent direction to the ascent direction are the same as that mentioned above, and these cases will be later mentioned.

Figure 9:
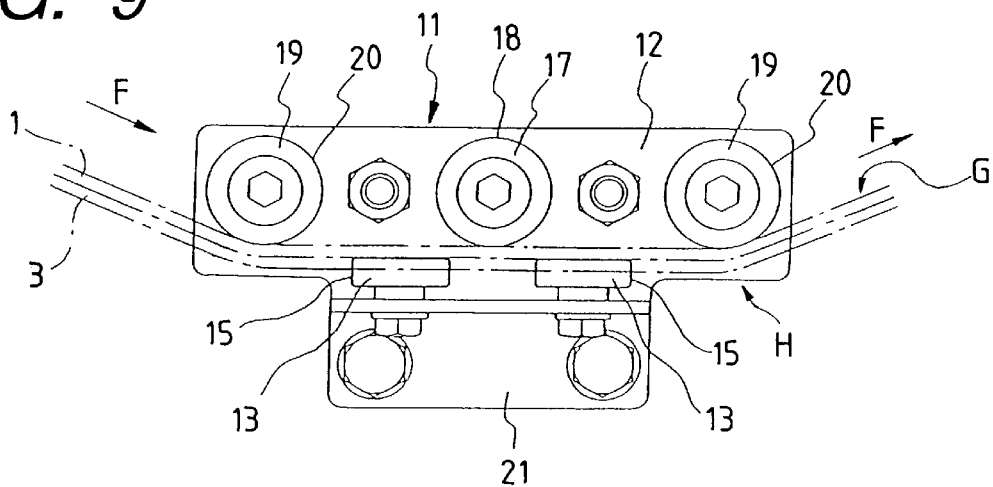
FIG. 9 is a front elevational view which shows an applied embodiment of a running direction changing and guiding apparatus for a conveyor belt.

Then, an applied embodiment of this embodiment is shown in FIG. 9, which shows the case of changing the running direction F by both running direction changing rollers 19 arranged at the upstream side and the downstream side with holding the belt pressing roller 17 therebetween, and in this case, since the changing of the running direction F of the belt main body 1 is performed by two stages, the running direction F of the belt main body 1 can be smoothly changed.

Figure 10:
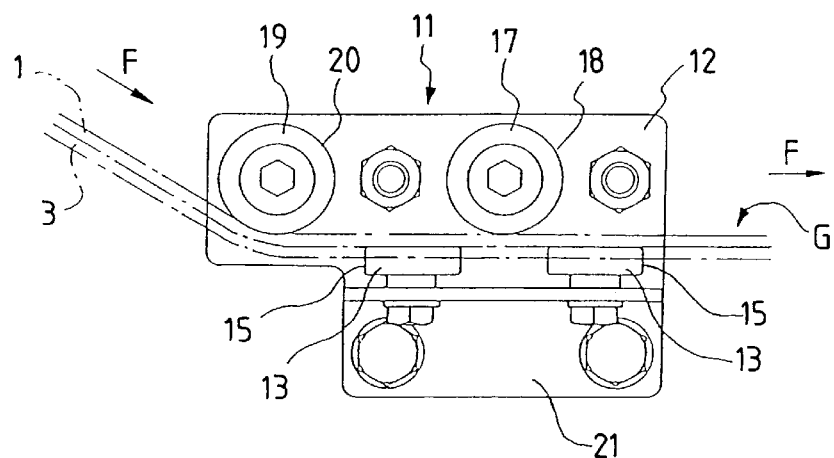
FIG. 10 is a schematic view which shows a structure of a second embodiment of a running direction changing and guiding apparatus for a conveyor belt in accordance with the present invention.

Then, FIG. 10 shows a second embodiment of a running direction changing and guiding apparatus for a conveyor belt according to the present invention, in which the running direction changing roller 19 is arranged only at the upstream side of the belt pressing roller 17 and the guide body supporting rollers 13 and 14 and the running direction F of the conveyor belt is changed on the upstream side of the belt pressing roller 17 and the guide body supporting rollers 13 and 14, so that a running direction changing and guiding apparatus for a conveyor belt made more compact and less expensive.

Figure 11:
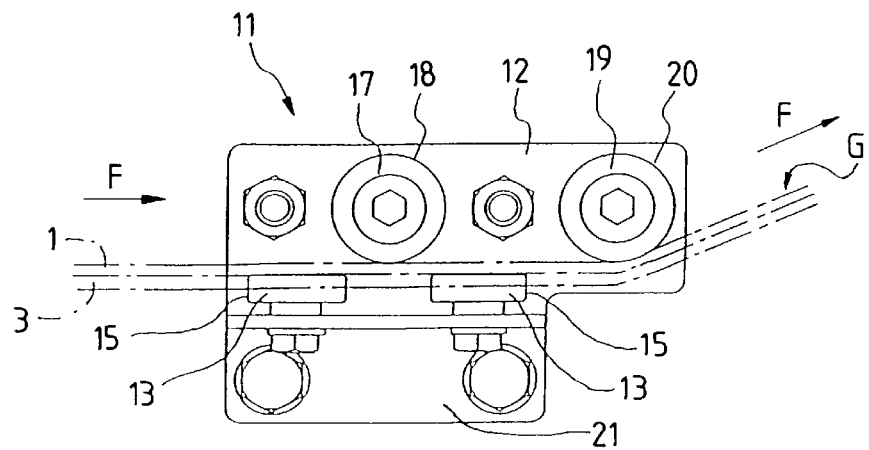
FIG. 11 is a schematic view which shows a structure of a third embodiment of a running direction changing and guiding apparatus for a conveyor belt in accordance with the present invention.

Further, FIG. 11 shows a third embodiment of the running direction changing and guiding apparatus for the conveyor belt according to the present invention, in which the running direction changing roller 19 is arranged only on the downstream side of the belt pressing roller 17 and the guide body sporting rollers 13 and 14 and the running direction F of the conveyor belt is changed on the downstream side of the belt pressing roller 17 and the guide body supporting rollers 13 and 14, so that a running direction changing apparatus for a conveyor belt is made more compact and less expensive.

Figure 12:
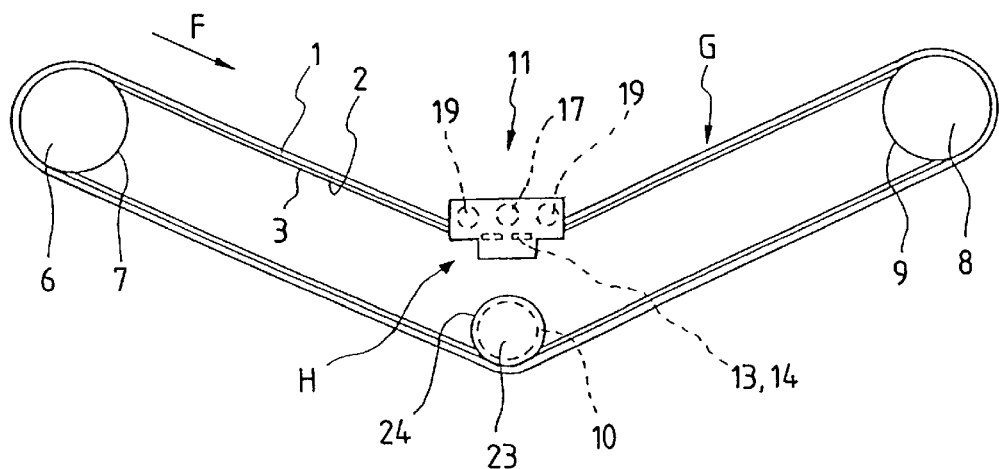
FIG. 12 is a front elevational view which shows a structure of a V-shaped conveyor belt in which a running direction of the conveyor belt is changed from a descent direction to an ascent direction.
Figure 13:
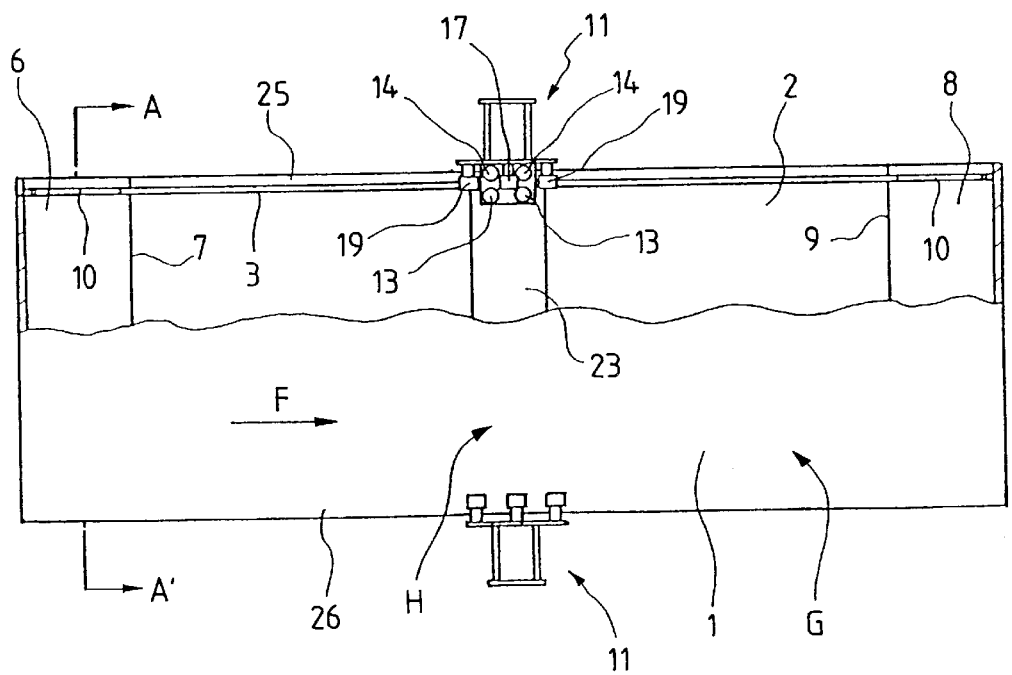
FIG. 13 is a plan view including a partial cross section of the conveyor belt shown in FIG. 12.

FIGS. 12 and 13 show a fourth embodiment of a conveyor belt according to the present invention, in which a V-shaped conveyor belt for changing the running direction F of the belt main body 1 from the descent direction to the ascent direction is shown, so that the running direction F of the conveyor belt, that is, the belt main body 1 is changed by the running direction changing and guiding apparatus 11 mounted at an optional position of the frame (not shown) of the conveyor belt in symmetrical in a lateral direction and guides and holds the left and right side portions 25 and 26 of the conveyor belt at an optional position and is capable of changing the running direction F thereof.

Further, the auxiliary pulley 23 for avoiding the back surfaces 2 of the belt main body 1 from being mutually brought into contact with each other is arranged below the changing portion H of the running direction F of the belt main body 1, and the auxiliary pulley 23 is also structured such that the guide groove 10 is formed on the peripheral surface 24 thereof in the same manner as the main drive pulley 6 and the driven puller 8, thereby preventing the belt main body 1 from moving in a zigzag manner.

A detail of the running direction changing and guiding apparatus 11 mounted to the conveyor belt according to the present invention (in this embodiment, the description will be given to a structure positioned at than left side portion 25 of the conveyor belt, however, since a structure positioned at the right side portion 26 is the same, the description thereof will be omitted) is substantially the same as the embodiment described with reference to FIGS. 5, 6, 7 and 8 mentioned above, so that the description thereof will be omitted here.

Further, the belt main 1 is so structured for change of a direction by the direction changing rollers 19 positioned on the upstream side and the downstream side of the belt pressing roller 17, and the direction changing roller 19 is so structured for the running direction F thereof to change by moving the transferring surface G of the belt main body 1 along the peripheral surface 20 in a state of pressing the left and right side portions 25 and 26 of the belt main body 1 from the transferring surface G side by the peripheral surface 20 thereof and at the same time to more securely hold the belt main body 1 in the changing portion H of the running direction F.

Then, as mentioned above, the changing of the running direction F of the belt main body 1 is performed in a state that the belt main body 1 is securely held to the changing portion H of the running direction F, whereby no looseness is generated in the conveyor belt wound between the main drive pulley 6 and the driven pulley 8, and further, since the belt pressing roller 17 and the running direction changing roller 19 constituting the running direction changing and guiding apparatus 11 for the conveyor belt and positioned at the transferring surface G side of the belt in body 1 hold only the left and right side portions 25 and 26 of the belt in body 1, these rollers do not interrupt the transferring surface G of the belt main body 1 and do not prevent the object from being transferred.

Accordingly, the conveyor belt according to the present invention can change the running direction F of the belt main body 1 from the descent direction to the ascent direction by the running direction changing and guiding apparatus 11 mounted to the conveyor belt within one conveyor belt, so that a V-shaped conveyor belt can be obtained and a cost for disposing and operating the conveyor belt can be reduced.

Figure 14:
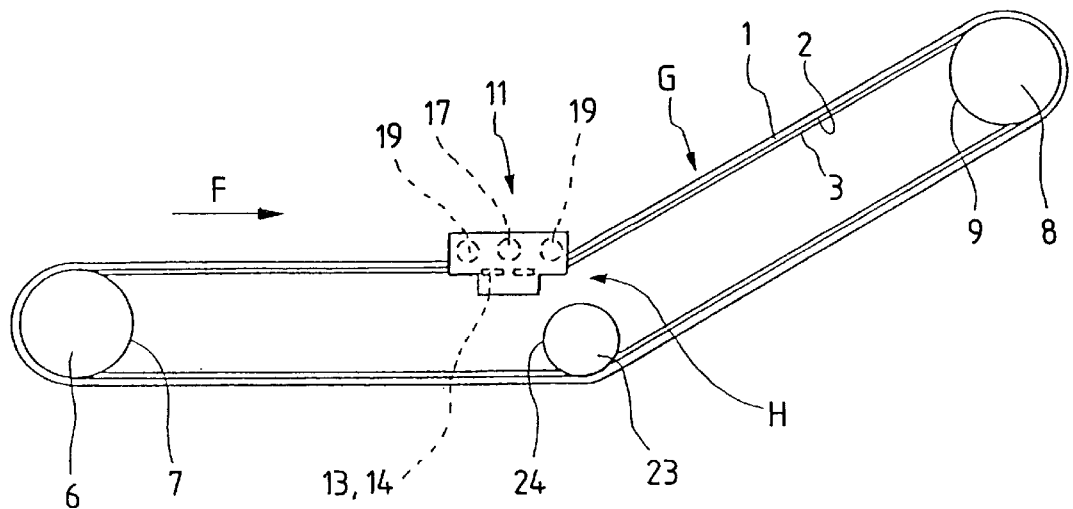
FIG. 14 is a front elevational view which shows a structure of a conveyor belt in which a running direction of the conveyor belt is changed from a horizontal direction to an ascent direction.
Figure 15:
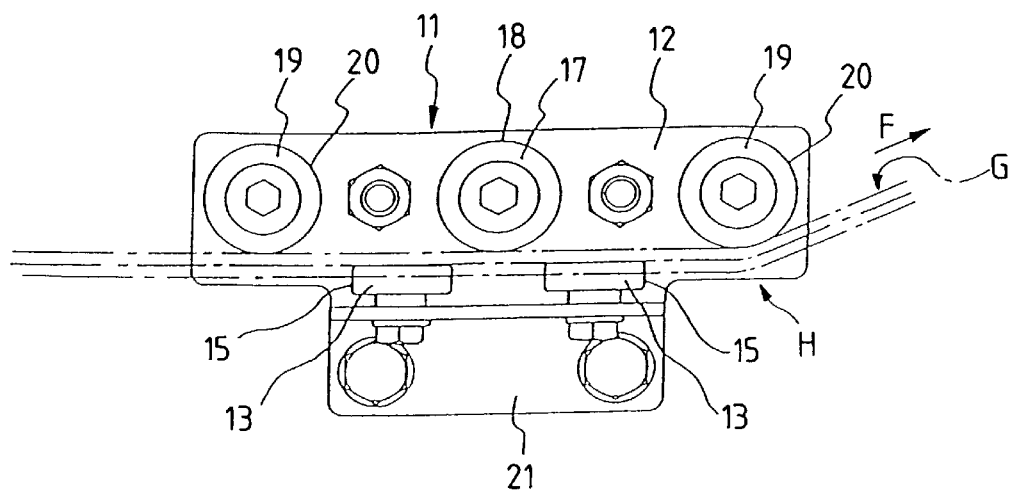
FIG. 15 is an elevational view of a running direction changing and guiding apparatus arranged in a conveyor belt in which a running direction of the conveyor belt is changed from a horizontal direction to an ascent direction.

Then, a fifth embodiment according to the present invention is shown in FIGS. 14 and 15, which is so structured such as to change the running direction F of the belt main body 1 in the conveyor belt by the changing portion H of the running direction F positioned between the main drive pulley 6 and the driven pulley 8 from the horizontal direction to the ascent direction, so that a conveyor belt which can change the running direction F of the belt main body 1 within one conveyor belt in the same manner as that of the fourth embodiment mentioned above can be obtained.

Further, in the case of the present embodiment, the running direction changing and guiding apparatus 11 is mounted to the horizontal portion of the conveyor belt, so that the running direction changing and guiding apparatus 11 can be easily mounted in this case. Still further, since the running direction F of the belt main body 1 is changed by the running direction changing roller 19 positioned on the downstream side of the running direction changing and guiding apparatus 11 and the transferring surface G of the belt main body 1 is kept flat immediately before the running direction F is changed by the running direction changing roller 19 (till the conveyor belt reaches the running direction changing roller 19 for changing the running direction F after passing through the belt pressing roller 17 from the running direction changing roller 19 not dealing with the change of the running direction F), the belt in body 1 can be smoothly guided between two pairs of guide body supporting rollers 13 and 14 opposing to each other so as to form a pair and the belt pressing roller 17, so that a guiding performance and a holding performance of the belt main body 1 by the running direction changing and guiding apparatus 11 can be well maintained.

Figure 16:
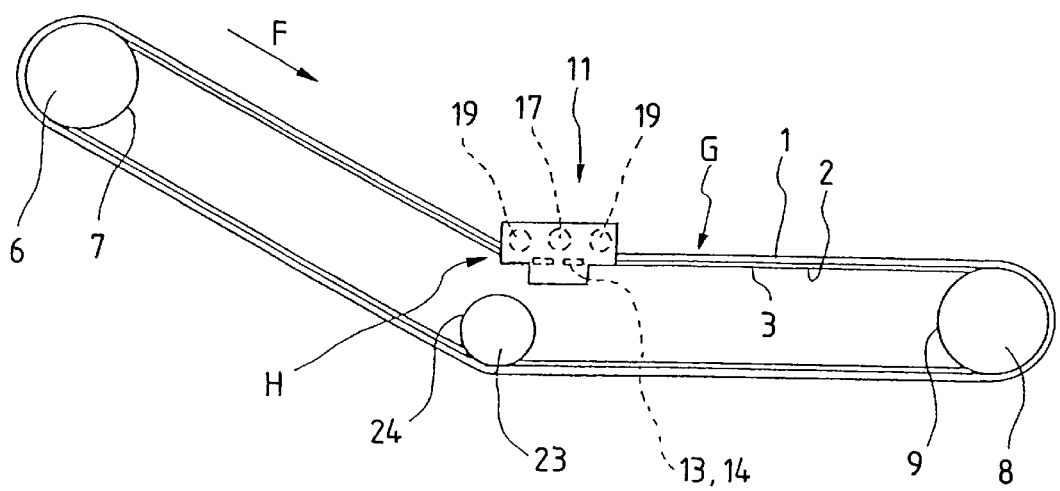
FIG. 16 is an elevational view which shows a structure of a conveyor belt in which a running direction of the conveyor belt is changed from a descent direction to a horizontal direction.
Figure 17:
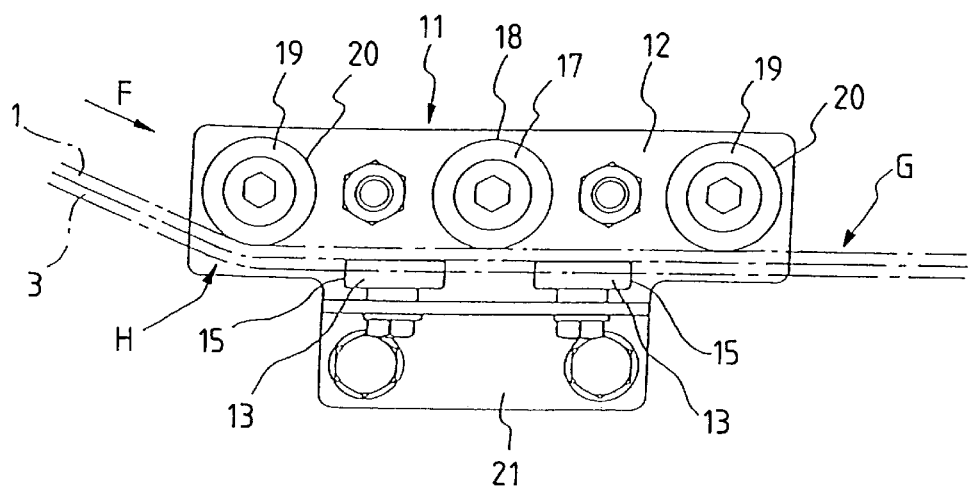
FIG. 17 is an elevational view of a running direction changing and guiding apparatus arranged in a conveyor belt in which a running direction of the conveyor belt is changed from a descent direction to a horizontal direction.

Then, a sixth embodiment in accordance with the present invention will be shown in FIGS. 16 and 17, which is structured so as to change the running direction F of the belt main body 1 in the conveyor belt from the descent direction to the horizontal direction by the changing portion H of the running direction F positioned between the main drive pulley 6 and the driven pulley 8, so that a conveyor belt which can change the running direction F of the belt main body 1 within one conveyor belt can be provided as in the above-mentioned fourth embodiment.

Further, also in this embodiment, since the running direction changing and guiding apparatus 11 is mounted to the horizontal portion of the conveyor belt in the same manner as the fifth embodiment mentioned above, the running direction changing and guiding apparatus 11 can be easily mounted.

Still further, since the running direction F of the belt main body 1 is changed by the running direction changing roller 19 positioned on the downstream side of the running direction changing and guiding apparatus 11 and the transferring surface G of the belt main body 1 is kept flat after the running direction F is changed by the running direction changing roller 19, that is, till the conveyor belt reaches the running direction changing roller 19 not dealing with the change of the running direction F after passing through the belt pressing roller 17 from the running direction changing roller 19 changing the running direction F, the belt main body 1 can be smoothly guided between two pairs of guide body supporting rollers 13 and 14 opposing to each other so as to form a pair and the belt pressing roller 17, so that a guiding performance and a holding performance of the belt main body 1 by the running direction changing and guiding apparatus 11 can be well maintained.

In this case, in the description of the fifth and sixth embodiments, the description of the portion having the same structure as that of the fourth embodiment is omitted.

Since the running direction changing and guiding apparatus 11 is arranged in each of the left and right side portions 25 and 26 in the widthwise direction perpendicular to the running direction F of the belt main body 1, which is in common to all the embodiments mentioned above, an appropriate tension can be applied to the widthwise direction.

Figure 18:
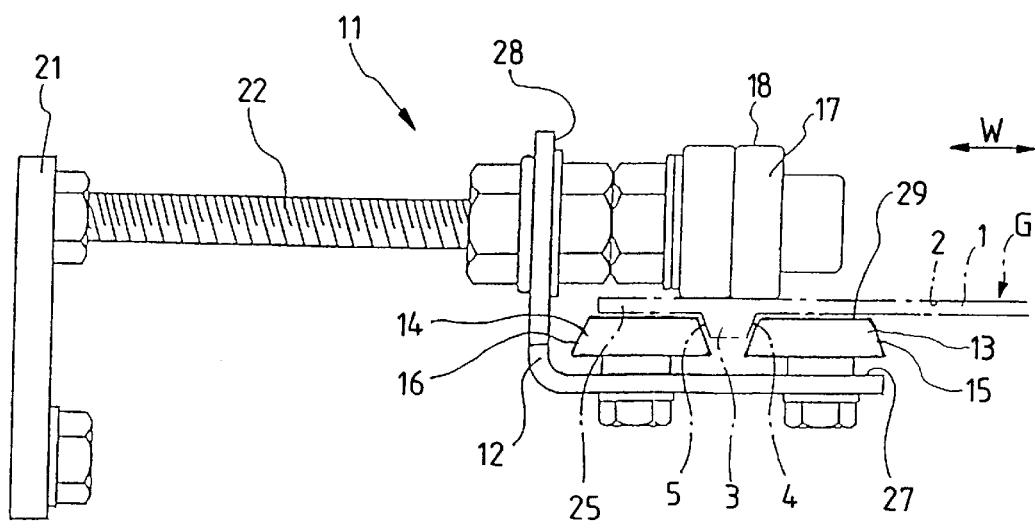
FIG. 18 is a schematic view similar to FIG. 8, which shows a modified embodiment of a guide body of a belt main body.

In this case, in each of the embodiments mentioned above, as representatively shown in FIG. 8, both side edges 4 and 5 of the guide body 3 cross in perpendicular to the back surface of the belt main body 1 (that is, a horizontal cross section of the guide body 3 is formed in a rectangular shape), however, the horizontal cross sectional shape of the guide body 3 is not always limited to the rectangular shape in accordance with the condition of use of the conveyor belt. For example, as shown in FIG. 18, the horizontal cross section of the guide body 3 may be formed in a tapered trapezoidal shape and a taper may be attached to the outer peripheral surface of the guide body supporting rollers 13 and 14.

As mentioned above, the following effects can be obtained by the present invention.

In accordance with the invention as claimed in claim 1, the running direction changing and guiding apparatus for the conveyor belt can be provided which can change the running direction of the conveyor belt in which the concave portion is formed on the transferring surface of the conveyor belt by only one conveyor belt.

In accordance with the invention as claimed in claim 2, the running direction changing and guiding apparatus for the conveyor belt can be provided which can be easily and securely mounted to the conveyor belt by structuring each of the guide body supporting rollers opposing to each other so as to form a pair, the belt pressing roller, and the running direction changing rollers constituting the running direction changing and guiding apparatus for the conveyor belt as an integral unit.

In accordance with the invention as claimed in claim 3, the running direction changing and guiding apparatus for the conveyor belt which can be used without relation to the right and left side at a time of mounting to the conveyor belt and can be easily mounted can be provided, and the running direction changing and guiding apparatus for the conveyor belt which allows the running direction of the belt main body to change in a more smooth manner can be provided.

In accordance with the invention as claimed in claim 4, the running direction changing and guiding apparatus for the conveyor belt for changing the running direction of the conveyor belt can be provided at a low cost.

In accordance with the invention as claimed in claim 5, the running direction changing and guiding apparatus for the conveyor belt for changing the running direction of the conveyor belt can be provided at a low cost.

In accordance with the invention as claimed in claim 6, the V-shaped conveyor belt which can change the running direction of the belt main body in the conveyor belt from the descent direction to the ascent direction by the changing portion of the running direction positioned between the main drive pulley and the driven pulley and can change the running direction of the belt main body within one conveyor belt can be provided.

In accordance with the invention as claimed in claim 7, the conveyor belt which can change the running direction of the belt main body in the conveyor belt from the horizontal direction to the ascent direction by the changing portion of the running direction positioned between the main drive pulley and the driven pulley and can change the running direction of the belt main body within one conveyor belt can be provided.

In accordance with the invention as claimed in claim 8, the conveyor belt which can change the running direction of the belt main body in the conveyor belt from the descent direction to the horizontal direction by the changing portion of the running direction positioned between the main drive pulley and the driven pulley and can change the running direction of the belt main body within one conveyor belt can be provided.

In accordance with the invention as claims in claim 9, the conveyor belt can be securely prevented from coming out.

What is claimed is:

1. An apparatus for changing and guiding a running direction of a conveyor belt, which is applied to a conveyor belt comprising a belt main body (1) wound between a main drive pulley (6) and a driven pulley (8) and structured such that, when the running direction of the conveyor belt is changed in the case that a changing portion (H) of the running direction (F) forms a concave portion on a transferring surface (G) of the conveyor belt, a zigzag motion when the belt main body (1) runs is prevented by engaging a guide body (3) linearly arranged in a back surface (2) of left and right side portions (25) and (26) of said belt main body (1) along a running direction (F) of the belt main body (1) with a guide groove (10) formed on a peripheral surface (7) of said main drive pulley (6) and a peripheral surface (9) of said driven pulley (8);

wherein a running direction changing and guiding apparatus (11) for said conveyor belt comprises guide body supporting rollers (13) and (14) opposing to each other so as to form a pair and supporting an inner side surface (4) and an outer side surface (5) of the guide body (3) arranged on the back surface (2) of the left and right side portions (25) and (26) of the belt main body (1) by peripheral surfaces (15) and (16) thereof, a belt pressing roller (17) for pressing the left and right side portions (25) and (26) of the belt main body (1) from the transferring surface (G) side toward the guide body supporting rollers (13) and (14) opposing to each other so as to form a pair by a peripheral surface (18) thereof for positioning said guide body (3) between the guide body supporting rollers (13) and (14) opposing to each other so as to form a pair, and a running direction changing roller (19) arranged in parallel to said belt pressing roller (17), pressing the left and right side portions (25) and (26) of the belt main body (1) from the transferring surface (G) side by a peripheral surface (20) thereof and changing the running direction (F) of the belt main body (1) by moving the transferring surface (G) of the belt main body (1) along the peripheral surface (20).

2. A running direction changing and guiding apparatus for a conveyor belt as claimed in claim 1, wherein each of a pair of guide body supporting rollers (13) and (14), the belt pressing roller 17 and the running direction changing roller (19) constituting said running direction changing and guiding apparatus (11) for the conveyor belt has a mounting member (21) capable of attaching to an optional position of a frame of the conveyor belt to which the main drive pulley (6) and the driven pulley (8) are supported, and mounted to an L-shaped main body frame (12) having a surface (28) perpendicular to and a surface (27) parallel to the transferring surface (G) of the conveyor belt, the guide body supporting rollers (13) and (14) opposing to each other so as to form a pair are mounted to the surface (27) parallel to the transferring surface (G) of the main body frame (12), and the belt pressing roller (17) and the running direction changing roller (19) are mounted to the surface (28) perpendicular to the transferring surface (G) of the main body frame (12), whereby the running direction changing and guiding apparatus (11) for the conveyor belt is constituted as an integral unit.

3. A running direction changing and guiding apparatus for a conveyor belt as claimed in claim 1 or 2, wherein said running direction changing roller (19) is arranged at an upstream side and a downstream side of the belt pressing roller (17) and the guide body supporting rollers (13) and (14), and the running direction (F) of the conveyor belt is changed in any one or both of the upstream side and the downstream side of the belt pressing roller (17) and the guide body supporting rollers 13 and (14).

4. A running direction changing and guiding apparatus for a conveyor belt as claimed in claim 1 or 2, wherein said running direction changing roller (19) is arranged at an upstream side of the belt pressing roller (17) and the guide body supporting rollers (13) and (14), and the running direction (F) of the conveyor belt is changed in the upstream side of the belt pressing roller (17) and the guide body supporting rollers (13) and (14).

5. A running direction changing and guiding apparatus for a conveyor belt as claimed in claim 1 or 2, wherein said running direction changing roller (19) is arranged at a downstream side of the belt pressing roller (17) and the guide body supporting rollers (13) and (14), and the running direction (F) of the conveyor belt is changed in the downstream side of the belt pressing roller (17) and the guide body supporting rollers (13) and (14).

6. A running direction changing and guiding apparatus for a conveyor belt as claimed in claim 1, wherein the running direction (F) of said belt main body (1) is changed at a changing portion (H) of the running direction (F) positioned between the main drive pulley (6) and the driver pulley (8) from a descent direction to an ascent direction, the guide body supporting rollers (13) and (14) opposing to each other so as to form a pair are disposed in each of the upstream side and the downstream side of the running direction (F) of the conveyor belt with holding the belt pressing roller (17) therebetween, that is, totally two pairs thereof are disposed, and an interval (S) between the guide body supporting rollers (13) and (14) opposing to each other so as to form a pair and positioned in the upstream side is set to be greater than an interval (T) between the guide body supporting rollers (13) and (14) opposing to each other and positioned in the downstream side.

7. A running direction changing and guiding apparatus for a conveyor belt as claimed in claim 1, wherein the running direction (F) of said belt main body (1) is changed at a changing portion (H) of the running direction (F) positioned between the main drive pulley (6) and the driver pulley (8) from a horizontal direction to an ascent direction, the guide body supporting rollers (13) and (14) opposing to each other so as to form a pair are disposed in each of the upstream side and the downstream side of the running direction (F) of the conveyor belt with holding the belt pressing roller (17) therebetween, that is, totally tho pairs thereof are disposed, and an interval (S) between the guide body supporting rollers (13) and (14) opposing to each other so as to form a pair and positioned in the upstream side is set to be greater than an interval (T) between the guide body supporting rollers (13) and (14) opposing to each other and positioned in the downstream side.

8. A running direction changing and guiding apparatus for a conveyor belt as claimed in claim 1, wherein the running direction (F) of said belt main body (1) is changed at a changing portion (H) of the running direction (F) positioned between the main drive pulley (6) and the driven pulley (8) from a descent direction to a horizontal direction, the guide body supporting rollers (13) and (14) opposing to each other so as to form a pair are disposed in each of the upstream side and the downstream side of the running direction (F) of the conveyor belt with holding the belt pressing roller (17) therebetween, that is, totally two pairs are disposed, and an interval (S) between the guide body supporting rollers (13) and (14) opposing to each other so as to form a pair and positioned in the upstream side is set to be greater than an interval (T) between the guide body supporting rollers (13) and (14) opposing to each other and positioned in the downstream side.

9. A running direction changing and guiding apparatus for a conveyor belt as claimed in any one of claims 6 to 8, wherein a horizontal cross section of said guide body (3) is formed in a tapered trapezoidal shape and a taper is formed on an outer peripheral surface of said guide body supporting rollers (13) and (14).

* * * * *